United States Patent [19]

Moreland

[11] Patent Number: 5,426,760
[45] Date of Patent: Jun. 20, 1995

[54] METHOD AND SYSTEM FOR STORING INDEX INFORMATION USING A BASE NUMBER OF BITS

[75] Inventor: Bruce L. Moreland, Bellevue

[73] Assignee: Microsoft Corporation, Redmond, Wash.

[21] Appl. No.: 992,580

[22] Filed: Dec. 18, 1992

[51] Int. Cl.⁶ .................. G06F 13/00; G06F 15/00
[52] U.S. Cl. ...................... 395/425; 395/400; 395/600
[58] Field of Search ............ 395/425, 400, 600; 365/49

[56] References Cited

U.S. PATENT DOCUMENTS

| | | | |
|---|---|---|---|
| 4,523,276 | 6/1985 | Maejima | 395/425 |
| 4,903,234 | 2/1990 | Sakuraba | 395/425 |
| 5,129,074 | 7/1992 | Kikuchi | 395/425 |

*Primary Examiner*—Thomas G. Black
*Assistant Examiner*—Jean R. Homere
*Attorney, Agent, or Firm*—Seed and Berry

[57] ABSTRACT

A method for storing a predetermined data set includes the step of selecting a base number of data bits to be used to store the data set. Each data word of the data set is defined as either a base value or an extended value. Base values are those that require a number of data bits less than or equal to the base number to be stored. Extended values are those that require a number of data bits greater than the base number to be stored. Base values are stored using a number of data bits equal to the base number and are provided with a prefix to indicate that the data word is a base value. Extended values are stored using a number of data bits greater than the base number and are provided with a prefix to indicate that the stored data word is an extended value, wherein the prefix further indicates the number of bits in excess of the base number that are used to store the extended value.

11 Claims, 3 Drawing Sheets

Example

200

| Nos. | Binary Representation | |
|---|---|---|
| E(1) = 48 | 110000 | b(1) = 6 |
| E(2) = 7 | 111 | b(2) = 3 |
| E(3) = 3 | 11 | b(2) = 2 |
| E(4) = 15 | 1111 | b(4) = 4 |
| E(5) = 5 | 101 | b(5) = 3 |
| E(6) = 11 | 1011 | b(6) = 4 |
| E(7) = 2 | 10 | b(7) = 2 |
| E(8) = 20 | 10100 | b(8) = 5 |
| E(9) = 11 | 1011 | b(9) = 4 |
| E(10) = 9 | 1001 | b(10) = 4 |

202

| Number Bits | Number of Elements |
|---|---|
| 2 | 2 |
| 3 | 2 |
| 4 | 4 |
| 5 | 2 |
| 6 | 1 |

204

| | Prefix | Encoding Value |
|---|---|---|
| E(1) = 48 | 110 | 10000 |
| E(2) = 7 | 0 | 0111 |
| E(3) = 3 | 0 | 0011 |
| E(4) = 15 | 0 | 1111 |
| E(5) = 5 | 0 | 0101 |
| E(6) = 11 | 0 | 1011 |
| E(7) = 2 | 0 | 0010 |
| E(8) = 20 | 10 | 0100 |
| E(9) = 11 | 0 | 1011 |
| E(10) = 9 | 0 | 1001 |

*Fig.2*

METHOD AND SYSTEM FOR STORING INDEX INFORMATION USING A BASE NUMBER OF BITS

TECHNICAL FIELD

The present invention is directed toward a method for storing data and, more particularly, toward a method for storing data to conserve memory space.

BACKGROUND OF THE INVENTION

More and more systems are relying upon read-only data bases that store information for use by electronic computers. As used herein, a read-only data base is one that is not constructed to permit the user to alter the data base. Typical data processing systems that rely upon read-only data bases are program data for personal computer programs, data for dedicated processing computers, on-line data base systems, commercial text retrieval systems, etc. The data, or information, stored by these systems typically includes a large number of data words, wherein each data word includes a plurality of binary data bits.

A common problem associated with storing the data words of a read only data base is the amount of overhead storage space required. As used herein, "storage space" refers to any space where the data words are stored and "overhead storage" space refers to that portion of the storage space required to store a data word that does not include data bits of the data word. As an example of overhead storage space, data processing systems that store a data base typically define in advance how many data bits will be associated with each data word of the stored information. The defined number of data bits are referred to herein as the predetermined number of data bits. The predetermined number of data bits to be associated with each data word is usually selected to accommodate the largest expected data word to be stored. Consequently, data words having less than the maximum number of expected data bits will also be stored using the predetermined number of data bits. The difference between the number of bits required to store the smaller data words and the predetermined number of data bits represents overhead storage. It is desirable, therefore, to provide a method for storing digital data that does not require unused data bits, or overhead, to store the smaller data words.

Several methods have been proposed for storing a data base without providing a predetermined number of data bits for each data word. However, these methods typically require additional bits to be associated and stored with each data word to describe to the data processing system reading the information the number of data bits in the associated data word. Although these systems have proven acceptable for some forms of data bases, these methods are not acceptable for a data base wherein the number of data bits required to store each data word falls within a limited range. This is because when the number of data bits required to store each data word falls within a limited range, the overhead associated with describing the number of data bits in each data word becomes unduly burdensome and detracts from the performance of these systems. Accordingly, it is desirable to provide a method of storing a data base without providing a predetermined number of data bits for each data word, and wherein the amount of overhead necessary to store each data word can be minimized.

SUMMARY OF THE INVENTION

The present invention is a method for storing a plurality of data words of a data base. In accordance with the subject method, a base number is selected prior to storing any data words, wherein the base number indicates the number of data bits to be used to store the data words of the data base. The method includes the step of storing base values using a number of data bits equal to the base number and adding a base prefix to indicate that the stored data word is a base value, wherein the base values are those ones of the plurality of data words that have a number of data bits less than or equal to the base number. The method further includes the step of storing extended values using a number of data bits greater than the base number and adding an extended prefix to indicate that the stored data word is an extended value, wherein the extended prefix further indicates the number of bits used to store the extended value. The extended values are those ones of the plurality of data words that have a number of bits greater than the base number.

BRIEF DESCRIPTION OF THE DRAWINGS

FIG. 2 includes three charts illustrating an example of how data is stored in accordance with the subject method.

DETAILED DESCRIPTION OF THE PREFERRED EMBODIMENT

The present invention provides a method for storing text indexes of the type used to provide search and retrieval services on a full text data base. As an example, the present invention will typically be employed for storing indexes to text retrieval services. Many such text retrieval services are presently available to users via services commonly referred to as "on-line" text services. These services usually provide text searching capability for a variety of data bases, on a subscription basis. The invention is also applicable to other areas where full text indexes are provided, such as, for example, full text data bases stored on compact disk. In addition to being used for full text indices, the present invention may be used for any application wherein data is stored. However, as will become apparent to those skilled in the art after reading the following description of the invention, it is most applicable to storing data wherein data can be characterized by a relatively narrow-sized distribution.

Figure 1:
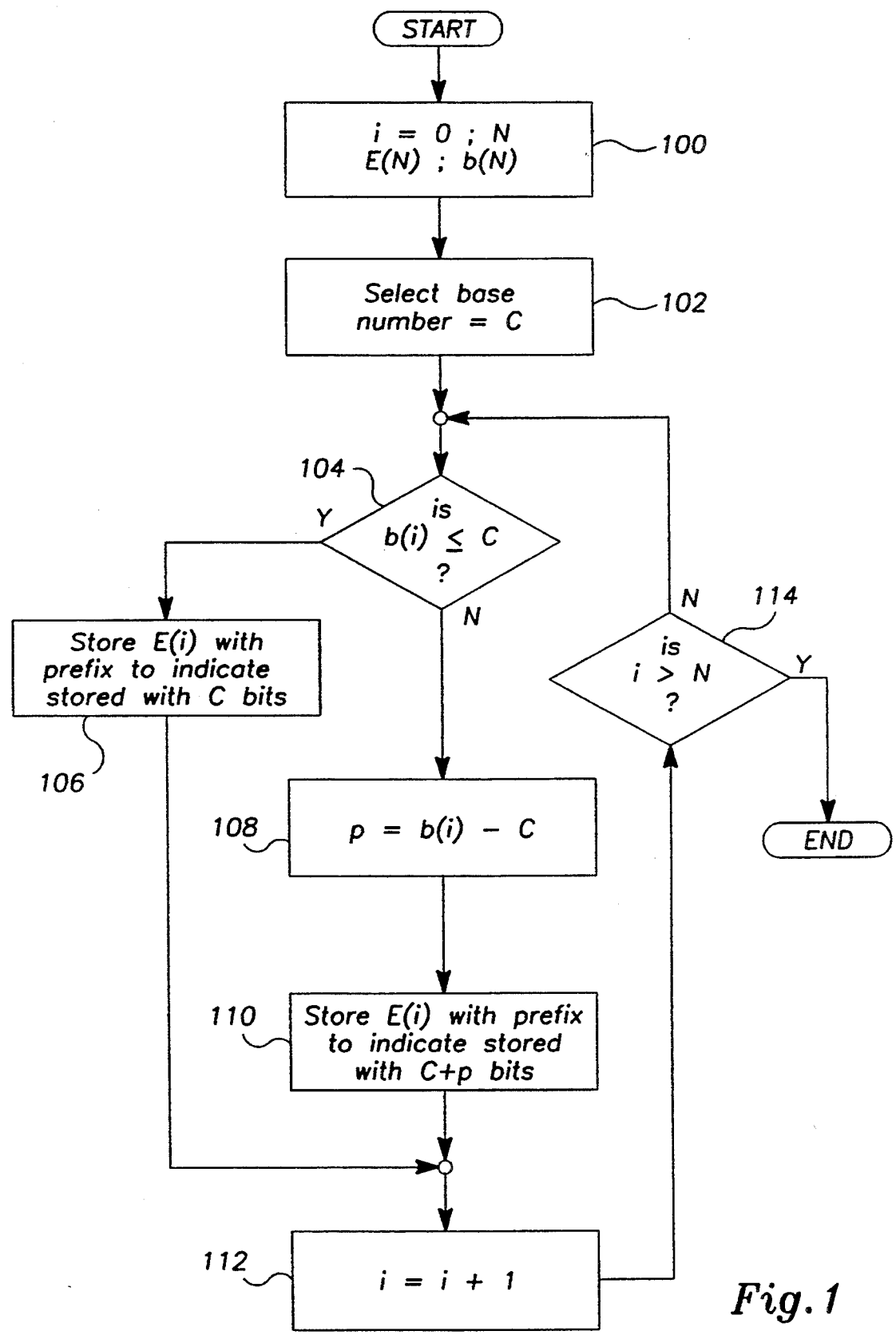
FIG. 1 is a decision flow diagram illustrating the method of the subject invention.

A method for storing digital data is illustrated in the decision flow diagram of FIG. 1. An example of how the data is stored in accordance with the method illustrated in FIG. 1 is provided in the charts of FIG. 2. Referring to FIG. 1, prior to storing any data words, a counter i is defined and is set equal to zero, step 100. The data words of the data base are defined in an array E(N) wherein N represents the total number of data words and wherein each data word of the array E(i) represents a data word. A second array b(N) is defined wherein each data word b(i) represents the number of data bits required to store the data word E(i).

It will be apparent to those skilled in the art that the subject invention is designed for use to store a read only data base, such as those that are used in on-line data base services, commercial text search and retrieval data bases, and other read-only data bases used with data processors such as personal computers, and dedicated data processors. More particularly, the subject invention is designed for use with data bases wherein the data words of the data base are all predetermined and not subject to change. However, those skilled in the art will appreciate that the subject method is equally applicable to data bases wherein the data words are periodically changed by the user.

After the arrays E(N) and b(N) are defined, a base number C is selected. In one presently-preferred embodiment of the invention, the base number represents the number of data bits required to store the maximum number of the plurality of data words without excess data bits. However, the base number may be selected by any of a variety of methods designed to select a number of bits that will accommodate a majority of data words in the data base. As an example, the base number may be selected as the mean number of data bits of the data words in the data base. Alternatively, the base number may be selected as the average number of data bits in the data words of the data base. In one presently-preferred embodiment of the invention, the base number is selected as the number of bits necessary to store the greatest number of data words in the data base without excess data bits. In still another presently-preferred embodiment of the invention, the base number is selected as the number that will minimize the total number of bits needed to store the entire index, as will be described in more detail below.

With reference to the example illustrated in FIG. 2, a data base is shown in chart 200 that consists of 10 data words, E(1)–E(10), that are to be stored. Initially, each data word is examined to determine the number of bits b(i) required to store the binary representation of the data word. As shown in chart 200, data word E(1) is equal to 48, having a binary representation of "110000," so that the number of bits required to represent the first data word in binary is six, i.e., b(1)=6. The examination of step 102 continues until each data word E(i) and the number of bits necessary to represent each data word in binary b(i) is defined.

Thereafter, the base number is selected. In one presently-preferred embodiment of the invention, the base number is selected as the number of data bits required to store the greatest number of data words, without excess data bits. Chart 202 of the example illustrated in FIG. 2 shows how the base number may be selected for the data words illustrated in chart 200. Referring to chart 202, 2 data words require 2 bits to be stored in binary, 2 data words require 3 bits to be stored in binary, 4 data words require 4 bits to be stored in binary, 2 data words require 5 bits to be stored in binary, and 1 data word requires 6 bits to be stored in binary. The greatest number of data words, i.e., 4, require 4 bits to be stored. Accordingly, the base number is selected to be equal to 4.

As discussed above, however, the base number can be selected in a number of ways, as will become apparent to those skilled in the art upon a further reading of the description of the invention.

After the base number is selected, each data word is encoded according to the method. Generally, the data words can be described as either base values or extended values. Base values are those data words that have a number of data bits less than or equal to the base number. Extended values are those data words that have a number of data bits greater than the base number. In the example of FIG. 2, data words E(1) and E(8) are both extended values requiring 6 and 5 data bits, respectively, to be stored in binary. The remaining data words are base values since they can each be stored with a number of data bits less than or equal to the base number, i.e., 4.

In accordance with the method of the subject invention, base values are stored using a number of bits equal to the base number and adding a prefix to identify the number as a base value, i.e., being stored with a number of data bits equal to the base number. Extended values are stored using a number of data bits greater than the base number and adding an extended prefix to indicate that the stored data word is an extended value. Further, the extended prefix indicates the number of data bits used to store the extended value. In a presently-preferred embodiment of the invention, the extended prefix indicates the number of data bits used to store the extended value by indicating the difference between the number of data bits required to store the extended value and the base number.

Referring again to FIG. 1, the determination of whether a data word is a base value or an extended value is made in step 104 by comparing the number of bits b(i) required to represent the data word in binary with the base number C. If the number of bits b(i) required to represent the data word in binary is less than or equal to the base number C then the data word is defined as a base value and is associated with a prefix to indicate that it is stored with a number of data bits equal to the base number, step 106. Conversely, if the number of data bits required to represent the data word is greater than the base number C then an extended prefix is provided as described above.

To provide the extended prefix, in accordance with a presently-preferred embodiment of the invention, a prefix data word p is defined as equal to the difference between the number of data bits b(i) required to store the subject data word E(i), and the base number C, step 108. The subject data word E(i) is then associated with a prefix selected to indicate that the subject data word is stored with C+p data bits, step 110. Thereafter, the variable i is incremented, step 112, and the method of steps 104–112 is repeated until each data word in the data base has been stored, step 114.

In a presently-preferred embodiment of the invention, a reset bit "0" is used to indicate that a base value is stored. In still another presently-preferred embodiment of the invention, a set bit is provided for each bit of an extended value in excess of the base number. For example, if the prefix number p is defined as 2 in step 108 (FIG. 1), then 2 set bits will be provided followed by a reset bit to indicate that the number that follows is comprised of 6 bits.

With reference to the example illustrated in FIG. 1, data word E(1) is equal to 48 and has a binary representation of "110000." As discussed above, the base number selected for the data base E(N) is 4. Accordingly, the prefix data word p for the first data word is 2. The first data word is therefore stored as having a prefix "110" followed by the data word "110000." Still further, as illustrated in chart 204 of FIG. 2, the inventors have determined that the most significant bit of each extended value will always be a logical 1. Accordingly, this bit can be deleted from the stored data word without loss of information, i.e., for any extended value the number of bits comprising the data word will be equal to $C+p-1$ and a logical 1 must be added to the data word as the most significant bit of the data word so that the resulting number of data bits will be $C+p$. Referring again to the first data word E(1) of chart 204, the prefix is "110," indicating that the number of data bits required to store the data word is 2 greater than the base number. The following data word is "10000," indicating that of the six data bits required to store the data word, the least significant 5 are "10000."

In similar fashion, the eighth data word E(8) is equal to 20, and has a binary representation of "10100" that includes 5 data bits, 1 data bit more than the selected base number. According to the method of FIG. 1, the eighth data word will be stored as illustrated in chart 204 of FIG. 2 as "100100." With respect to the remaining data words, each includes a number of data bits less than or equal to the base number. Accordingly, each of these data words is stored using 4 data bits and a reset bit for a prefix. It will be apparent to those skilled in the art that the prefix of the subject invention can be viewed as a prefix that indicates a base value or extended value, as discussed above, or can be viewed as a prefix having a first portion indicating a number of data bits in excess of the base number and a second portion indicating that the remaining data bits comprise the stored data word. It is important, however, to the subject invention that a prefix be provided to indicate the number of data bits used to store the data word.

In application, the foregoing method will be typically performed by a computer program designed for compressing and storing full text indices. In general, the computer program will be designed to store information to identify each word used in the data base as well as identifying the location wherein the word is used. After the word and locations have been so identified, the program will compress the data using the method described above. At a later time, the compressed data can be accessed by the original program that stored the data, or, most likely, by another program specifically designed for using the full text index to search the data base, all as is known in the art.

Although the invention has been discussed above by reference to data words, and particularly the data words illustrated in chart 200 of FIG. 2 having numeric data words associated therewith, it will be apparent to those skilled in the art that the subject invention could be used with any digital data element to be stored for use by a data processing system.

As mentioned hereinabove, several methods can be used for determining the base value in accordance with the present invention. One method, discussed briefly above, is to determine the total number of excess bits required to store each value and, to select the base value that minimizes the excess bit total. One way to make this determination would be to determine how many bits will be wasted for each value when the base value is a predetermined number, and to multiply the number of wasted bits for each data word by the number of data words having the respective number of bits. However, those skilled in the art will recognize that this method is time consuming for a data processing device since it requires a number of repeated multiplications.

Figure 3:
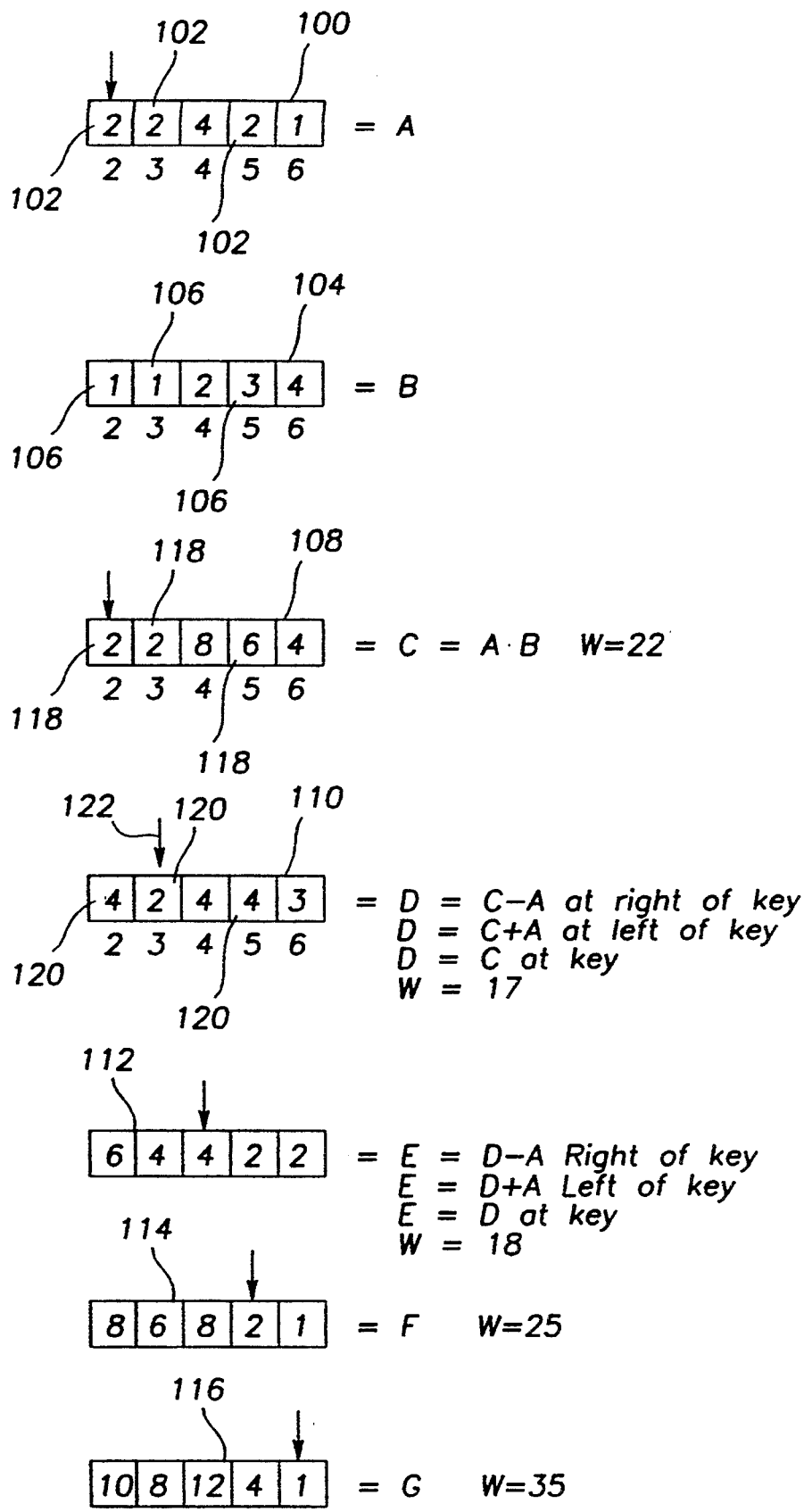
FIG. 3 is an improved method for determining the total number of wasted bits for each possible base value.

An improved method for determining the total number of wasted bits for each possible base value is illustrated in FIG. 3. Therein, a first array 100 is defined having a plurality of values 1()2 wherein each value in the first array represents the number of data words that can be stored by an associated number of data bits, without any excess data bits. It will be apparent to those skilled in the art that the entries for the first array 100 were provided from the chart 202 of FIG. 2. A second array 104 having a plurality of values 106 wherein each value in the second array is associated with a respective value in the first array 100 and, therefore, associated with a number of data bits. More particularly, the values 106 in the second array 104 represent the number of data bits, in excess of the base value, required to store a data word having the associated number of data bits, for a predetermined base value. In the example of FIG. 3, the predetermined base value for the second array 104 is 2.

After the first and second arrays 100 and 104 are defined, a number of resulting arrays 108–116 are defined wherein each array 108–116 includes a plurality of values that represent the wasted data bits for a predetermined base value. More particularly, array 108 is defined as the product of the respective values of arrays 100 and 104. Accordingly, array 108 includes a plurality of values 118 wherein each value 118 is associated with a number of data bits and represents the product of the value from the arrays 100 and 104 associated with the respective number of data bits. The sum of the values 118 of the array 108 represents the number of wasted data bits when the base value is selected at 2, i.e., 22.

Array 110 also includes a plurality of values 120 wherein each value 120 is associated with a respective number of data bits. The values 120 represent the number of data bits that will be wasted for storing the plurality of data words having the associated number of data bits. However, the array 110 is determined by adding and subtracting the values of the arrays 100 and 108, without any multiplications. More particularly, the base value for the array 110 is selected at 3 as indicated by the arrow 122. The value 120 for the array 110 are determined by subtracting the respective value of the array A from the respective value of the array 108. Similarly, the values to the left of the arrow 122 are determined by adding the respective values of the arrays 100 and 108. The value at the arrow 122 is equal to the respective value from the array 108. The sum of the values of the array 110, i.e., 17, equals the total number of wasted bits to store the data values illustrated in chart 200 when the base value is selected at 3.

The array 112, 114, and 116 are determined in the same manner as the array 110, without any additional multiplication. It will be apparent to those skilled in the art that the above described method can also be implemented by selecting the initial base value differently. In the example above, the base value was selected at a low value and increased. However, a high base value could be selected and decreased. When the base value is decreasing, subsequent arrays are determined: by subtracting the first array 100 from the previous array to determine values less than or equal to that corresponding to the base value; by providing the respective value from the previous array for the value one greater than that corresponding to the base value; and by adding the first array 100 to the previous array to determine the remaining values.

From the foregoing, it will be appreciated that, although specific embodiments of the invention have been described herein for purposes of illustration, various modifications may be made without deviating from the spirit and scope of the invention. Accordingly, the invention is not limited except as by the appended claims.

I claim:

1. A method for storing a plurality of index information wherein the index information includes a plurality of elements to be stored and wherein each element is represented by a data word, said method comprising the steps of:
    (a) examining each element of an index to be stored to determine the number of bits necessary to store the data word that represents each element;
    (b) creating an array B(X) wherein B represents the number of bits necessary to store an element and X represents the number of elements in the index that require B bits or fewer to be stored:
    (c) determining which member in the array B(X) has the greatest value of X and selecting the associated number of bits B as a center data word C for bits required to store the greatest number of elements;
    (d) selecting a first element of the index as a next element to be stored;
    (e) determining whether the next element to be stored is represented by a data word that can be stored in C bits or less and, if not, performing steps (f)-(h) and, if so, performing step (i);
    (f) storing a prefix data word to indicate the number of bits in excess of the center data word required to store the next element to be stored wherein the prefix comprises a set bit for each bit in excess of the center data word;
    (g) storing a reset bit to separate the prefix and the data word representing the element to be stored;
    (h) discarding the most significant bit of the representative data word of the element to be stored, storing the remaining bits of the data word representing the next element to be stored, and performing step (j);
    (i) providing a reset bit followed by the data word representing the next element to be stored, and performing step (j); and
    (j) selecting another element of the index as the next element to be stored and repeating steps (e) through (j) until each element is stored.

2. A method for storing a plurality of data words, said method comprising the steps of:
    determining a base number;
    when the number of bits needed to represent a data word is less than or equal to the base number, storing a base value by using a number of bits equal to the base number to represent the data word, and by using a base prefix to indicate that the data word is represented by a number of bits equal to the base number; and
    when the number of bits needed to represent a data word is greater than the base number, storing extended values by using a number of bits greater than the base number to represent the data word, and by using an extended prefix to indicate that the data word is an extended value, wherein the extended prefix is indicative of the difference between the base number and the number of bits needed to store the extended value.

3. The method as recited in claim 2 wherein the step of storing extended values, further comprises the sub step of:
    providing a number of first bits wherein the number of first bits provided is indicative of the difference between the base number and the number of first bits, for distinguishing the number of first bits from the extended value.

4. The method as recited in claim 3 wherein the step of storing extended values further comprises the substep of:
    providing a second bit, distinguished from the number of first bits, for distinguishing the number of first bits from the extended value.

5. The method as recited in claim 2 wherein the step of selecting a base number comprises the substeps of:
    determining the number of bits required to store each data word; and
    selecting as the base number the number of bits required to store the greatest number of data words.

6. A method for storing a plurality of values, said method comprising the steps of:
    (a) selecting a base number; and
    (b) storing each of the plurality of values using both a number of data bits equal to or greater than the base number and a prefix to indicate a difference between the base number and a number of bits needed to store the value.

7. The method as recited in claim 6 wherein step (b), storing the plurality of values, comprises the substeps of:
    (c) storing base values using a number of data bits equal to the base number and a base prefix to indicate that the stored value is a base value, wherein the base values are those ones of the plurality of values that have a number of bits less than or equal to the base number; and
    (d) storing extended values using a number of bits greater than the base number and an extended prefix to indicate that the stored value is an extended value, wherein the extended prefix further indicates the number of bits used to store the extended value, the extended values being those ones of the plurality of values that have a number of bits greater than the base number.

8. The method as recited in claim 7 wherein step (d), storing extended values, further comprises the substep of:
    (e) providing an extended prefix that is indicative of the difference between the base number and the number of bits needed to store the extended value.

9. The method as recited in claim 6 wherein step (a), selecting a base number, comprises the substeps of:
    (f) determining the number of bits required to provide a binary representation of each value; and
    (g) selecting as the base number the number of bits required to store the greatest number of values.

10. The method as recited in claim 7 wherein step (a), selecting a base number, comprises the substeps of:
    (f) obtaining first and second test base numbers;
    (g) determining how many bits will be required to store each of the plurality of values using the first and second test base numbers in accordance with steps (c) and (d); and
    (h) selecting the first test base number as the base number if the number of bits required to store each value using the first test base number is less than the number of data bits required to store each value using the second test base number, otherwise, selecting the second test base number as the base number.

11. The method as recited in claim 10 wherein step (g), determining how many bits will be required to store each value using the first and second test base numbers, comprises the substeps of:

(i) providing a first array of integers wherein each integer in the first array represents the number of values that can be stored by an associated number of data bits, without any excess data bits;

(j) providing a second array of integers wherein each integer in the second array is associated with a respective integer in the first array and wherein each integer in the second array represents the number of data bits, in excess of the first test base number, required to store a value having the associated number of data bits, using the method of steps (c) and (d);

(k) multiplying each value in the first array by its respective value in the second array to provide a third array wherein the sum of the values in the second array represents the number of data bits required to store each value using the method of steps (c) and (d) and the first test base value; and (l) providing a fourth array wherein each value in the fourth array is selected as follows:

(i) for each value in the first and third arrays that is associated with a number of bits less than the second test base number, adding the respective values in the first and third arrays to provide the respective value for the fourth array;

(ii) for the value in the first and third array that is associated with a number of bits equal to the second test base number, selecting the value from the third array for the respective value of the fourth array; and (iii) for each value in the first and third arrays that is associated with a number of bits greater than the second test base number, subtracting the values of the first from the respective values of the third arrays to provide the respective value for the fourth array;

wherein the sum of the values in the fourth array represents the number of data bits required to store each data word using the method of steps (c) and (d) and the second test base value.

* * * * *